US010019870B2

(12) United States Patent
Arnone et al.

(10) Patent No.: US 10,019,870 B2
(45) Date of Patent: *Jul. 10, 2018

(54) RANDOMIZED INITIAL CONDITION HYBRID GAMES

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/253,813

(22) Filed: Apr. 15, 2014

(65) Prior Publication Data

US 2014/0228083 A1 Aug. 14, 2014

Related U.S. Application Data

(63) Continuation of application No. PCT/US2013/038296, filed on Apr. 25, 2013.

(Continued)

(51) Int. Cl.
*A63F 9/24* (2006.01)
*G07F 17/32* (2006.01)
(Continued)

(52) U.S. Cl.
CPC .......... *G07F 17/3244* (2013.01); *G07F 17/32* (2013.01); *G07F 17/3262* (2013.01);
(Continued)

(58) Field of Classification Search
CPC ............. G07F 17/3244; G07F 17/3295; G07F 17/3262; G07F 17/3267; G07F 17/3286;
(Continued)

(56) References Cited

U.S. PATENT DOCUMENTS 5,413,357 A 5/1995 Schulze et al.
5,718,429 A 2/1998 Keller
(Continued)

FOREIGN PATENT DOCUMENTS

JP 2001300098 A 10/2001
JP 2003111980 A 4/2003
(Continued)

OTHER PUBLICATIONS

U.S. Appl. No. 14/205,303 Arnone, et al., filed Mar. 11, 2014.
(Continued)

*Primary Examiner* — Justin Myhr
(74) *Attorney, Agent, or Firm* — Caitlyn Ross

(57) ABSTRACT

Systems and methods in accordance with embodiments of the invention operate a randomized initial condition hybrid game including a gambling game providing a game of chance and an entertainment game providing a game of skill, where the autonomous agent hybrid game utilizes a randomized initial condition module constructed to: communicate an initial condition random value request that triggers a random number generator of gambling game to generate at least one initial condition random value; communicate at least one initial condition that triggers generation of an initial condition within an entertainment game gameplay session, where: the initial condition setting is based upon at least one initial condition random value; at least one payout parameter is determined upon the generation of an initial condition; and communicate a gambling event occurrence detected from the entertainment game that triggers a wager made using at least one payout parameter to produce a wager payout.

10 Claims, 13 Drawing Sheets

Related U.S. Application Data

(60) Provisional application No. 61/637,927, filed on Apr. 25, 2012.

(51) Int. Cl.
A63F 13/822 (2014.01)
A63F 13/837 (2014.01)

(52) U.S. Cl.
CPC ........ *G07F 17/3295* (2013.01); *A63F 13/822* (2014.09); *A63F 13/837* (2014.09); *G07F 17/329* (2013.01)

(58) Field of Classification Search
CPC ............. G07F 17/3288; G07F 17/3209; G07F 17/323; G07F 17/329; G07F 17/3258; G07F 17/326; A63F 13/798; A63F 2300/807
USPC ............................................ 463/7–9, 16, 22
See application file for complete search history.

(56) References Cited

U.S. PATENT DOCUMENTS

| | | |
|---|---|---|
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,938,727 B1 | 5/2011 | Konkle |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,475,266 B2 | 7/2013 | Arnone |
| 8,480,470 B2 | 7/2013 | Napolitano et al. |
| 2001/0004609 A1 | 6/2001 | Walker et al. |
| 2001/0019965 A1 | 9/2001 | Ochi |
| 2002/0022509 A1 | 2/2002 | Nicastro |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2006/0281509 A1* | 12/2006 | Arias-Vargas et al. ........... 463/8 |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |

(56) References Cited

U.S. PATENT DOCUMENTS

| | | |
|---|---|---|
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218024 A1* | 9/2011 | Baerlocher .................. 463/16 |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |

FOREIGN PATENT DOCUMENTS

| | | |
|---|---|---|
| JP | 2004097610 A | 4/2004 |
| JP | 2004166746 A | 6/2004 |
| WO | 9851384 A1 | 11/1998 |
| WO | 2010087090 A1 | 8/2010 |
| WO | 2011109454 A1 | 9/2011 |
| WO | 2012139083 A1 | 10/2012 |
| WO | 2013059308 A1 | 4/2013 |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
Itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.

(56) References Cited

OTHER PUBLICATIONS

U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
International Search Report and Written Opinion, PCT/US2013/38296, dated Aug. 19, 2013.

\* cited by examiner

US 10,019,870 B2

RANDOMIZED INITIAL CONDITION HYBRID GAMES

CROSS REFERENCE TO RELATED APPLICATIONS

This application is a continuation of Patent Cooperation Treaty Application No. PCT/US13/38296, filed on Apr. 25, 2013, which claims the benefit of U.S. Provisional Patent Application No. 61/637,927, filed on Apr. 25, 2012, the content of each which is hereby incorporated by reference in its entirety as if stated in full herein. This application references Patent Cooperation Treaty Application No. PCT/US11/26768, filed Mar. 1, 2011, and Patent Cooperation Treaty Application No. PCT/US11/63587, filed Dec. 6, 2011, the content of each of which is hereby incorporated by reference in its entirety as if stated in full herein.

FIELD OF THE INVENTION

Embodiments of the present invention are generally related to gaming and more specifically to randomized initial condition hybrid games that include both an entertainment game and a gambling game with a randomized initial condition in the entertainment game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game can depend upon a player's skill with the game. Gambling games are typically not as interactive and do not include graphics as sophisticated as an entertainment game, which is a game of skill such as a video game.

SUMMARY OF THE INVENTION

Systems and methods in accordance with embodiments of the invention operate a randomized initial condition hybrid game. One embodiment includes a randomized initial condition hybrid game, including: a real world engine constructed to provide a randomly generated payout of real world credits from a wager in a gambling game; an entertainment software engine constructed to execute an entertainment game providing outcomes based upon skillful execution of the entertainment game to earn a payout of game world credits; and a game world engine constructed to manage the entertainment software engine and communicate gambling event occurrences based upon the skillful execution of the entertainment game to trigger a wager in the gambling game to the gambling game; where the game world engine utilizes a randomized initial condition module constructed to: communicate an initial condition random value request to the real world engine that triggers a random number generator of the real world engine to generate at least one initial condition random value; communicate at least one initial condition setting to the entertainment software engine that triggers the entertainment software engine to generate an initial condition within an entertainment game gameplay session, where: the initial condition setting is based upon at least one initial condition random value and determined in accordance with at least one initial condition setting determination rule; at least one payout parameter is determined upon the generation of an initial condition in accordance with at least one payout parameter determination rule; and communicate a gambling event occurrence detected from the skillful execution of the entertainment game in accordance with at least one gambling event occurrence rule to a real world engine, where the gambling event occurrence triggers a wager made using at least one payout parameter in accordance with a wager execution rule within the gambling game executed by the real world engine to produce a wager payout as a randomly generated payout of gameplay resources from the wager.

In a further embodiment, at least one payout parameter is dependent upon entertainment game gameplay progress following the generation of an initial condition.

In another embodiment, at least one payout parameter is independent of entertainment game gameplay progress following the generation of an initial condition.

In a still further embodiment, the initial condition random value request is communicated prior to initiation of an entertainment game gameplay session.

In still another embodiment, the initial condition random value request is communicated during an entertainment game gameplay session.

In a yet further embodiment, the at least one initial condition setting communicated to the entertainment software engine includes the initial condition random value.

In yet another embodiment, gameplay resources wagered in a wager includes gameplay resources selected from the group consisting of: real world credits, game world credits and elements, where elements are a limited resource consumed within the entertainment game to advance entertainment game gameplay.

In a further embodiment again, gameplay resources wagered in a wager includes real world credits.

In another embodiment again, at least one gambling event occurrence rule detects the gambling event occurrence as a player action that is a consumption of an element, where an element is a limited resource consumed within the entertainment game to advance entertainment game gameplay.

In a further additional embodiment, at least one gambling event occurrence rule detects the gambling event occurrence as a player action that achieves a combination of elements associated with a player profile, where elements are a limited resource consumed within the entertainment game to advance entertainment game gameplay.

In another additional embodiment, at least one wager execution rule configures the real world engine to produce a wager payout from a wager of gameplay resources associated with a player profile using a random value generated from the real world engine's random number generator and a pay table associated with at least one payout parameter.

In a still yet further embodiment, at least one payout parameter is a predetermined gambling result generated by the real world engine prior to triggering a wager made using the at least one payout parameter that is a predetermined gambling result, where the predetermined gambling result can be scaled by wagered gameplay resources to yield a wager payout.

A still yet another embodiment includes a method of operating a randomized initial condition hybrid game, including: communicating an initial condition random value request to a real world engine that triggers a random number generator of the real world engine to generate at least one initial condition random value using a randomized initial condition module utilized by a game world engine, where a randomized initial condition hybrid game includes: the real world engine constructed to provide a randomly generated payout of real world credits from a wager in a gambling game; an entertainment software engine constructed to execute an entertainment game providing outcomes based upon skillful execution of the entertainment game to earn a payout of game world credits; and the game world engine constructed to manage the entertainment software engine and communicate gambling event occurrences based upon the skillful execution of the entertainment game to trigger a wager in the gambling game to the gambling game; communicating at least one initial condition setting to the entertainment software engine that triggers the entertainment software engine to generate an initial condition within an entertainment game gameplay session using the randomized initial condition module, where: the initial condition setting is based upon at least one initial condition random value and determined in accordance with at least one initial condition setting determination rule; at least one payout parameter is determined upon the generation of an initial condition in accordance with at least one payout parameter determination rule; and communicating a gambling event occurrence detected from the skillful execution of the entertainment game in accordance with at least one gambling event occurrence rule to a real world engine using the randomized initial condition module, where the gambling event occurrence triggers a wager made using at least one payout parameter in accordance with a wager execution rule within the gambling game executed by the real world engine to produce a wager payout as a randomly generated payout of gameplay resources from the wager.

In a still further embodiment again, at least one payout parameter is dependent upon entertainment game gameplay progress following the generation of an initial condition.

In still another embodiment again, at least one payout parameter is independent of entertainment game gameplay progress following the generation of an initial condition.

In a still further additional embodiment, the initial condition random value request is communicated prior to initiation of an entertainment game gameplay session.

In still another additional embodiment, the initial condition random value request is communicated during an entertainment game gameplay session.

In a yet further embodiment again, the at least one initial condition setting communicated to the entertainment software engine includes the initial condition random value.

In yet another embodiment again, gameplay resources wagered in a wager includes gameplay resources selected from the group consisting of: real world credits, game world credits and elements, where elements are a limited resource consumed within the entertainment game to advance entertainment game gameplay.

A yet further additional embodiment includes a machine readable medium containing processor instructions, where execution of the instructions by a processor causes the processor to perform a process including: communicating an initial condition random value request to a gambling game to generate at least one initial condition random value, communicating at least one initial condition setting to an entertainment game to generate an initial condition within an entertainment game gameplay session, where: the initial condition setting is based upon at least one initial condition random value and determined in accordance with at least one initial condition setting determination rule; at least one payout parameter is determined upon the generation of an initial condition in accordance with at least one payout parameter determination rule; and communicating a gambling event occurrence detected from the skillful execution of the entertainment game in accordance with at least one gambling event occurrence rule to a gambling game, where the gambling event occurrence triggers a wager made using at least one payout parameter in accordance with a wager execution rule within the gambling game to produce a wager payout as a randomly generated payout of gameplay resources from the wager.

DETAILED DESCRIPTION

Figure 1:
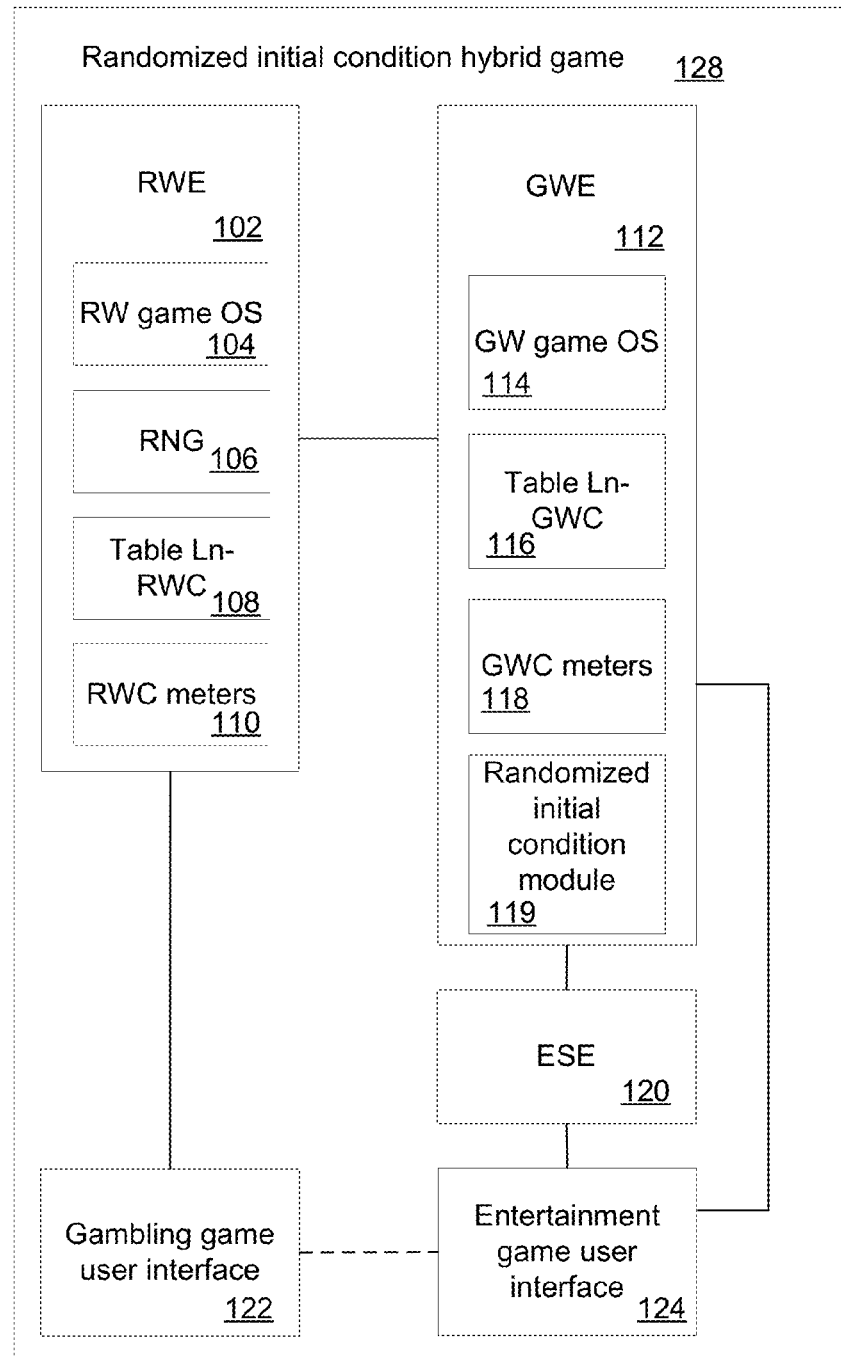
FIG. 1 illustrates a randomized initial condition hybrid game in accordance with an embodiment of the invention.

Turning now to the drawings, systems and methods for operation of randomized initial condition hybrid games are illustrated. In several embodiments, a randomized initial condition hybrid game is a form of a hybrid game that integrates a randomized initial condition module with both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the randomized initial condition hybrid game also includes a user interface associated with either or both the gambling game and the entertainment game. A player of a randomized initial condition hybrid game is the electronic representation of interactions, typically via a user interface, associated with a player profile of the randomized initial condition hybrid game. In operation of a randomized initial condition hybrid game, a player acts upon various types of elements of the entertainment game in a game world environment. Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game using real world credits (RWC). The real world credits can be credits in an actual currency, or can be credits in a virtual currency which has real world value. Gambling outcomes from the gambling game can cause consumption, loss or accrual of RWC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RWC value if cashed out of a randomized initial condition hybrid game gameplay session. Example elements include enabling elements (EE) which are elements that enable a player's play of the entertainment game and whose consumption by the player while playing the entertainment game can trigger a wager in a gambling game. Another example of an element is a reserve enabling element (REE), which is an element that converts into one or more enabling elements upon occurrence of a release event in hybrid game gameplay. Other types of elements include actionable elements (AE) which are elements that are acted upon to trigger a wager in the gambling game and cannot be restorable during normal play of the entertainment game. In progressing through entertainment game gameplay, elements can be utilized by a player during interactions with a controlled entity (CE) which is a character, entity, inanimate object, device or other object under control of a player. Also, entertainment game gameplay progress can be dependent upon: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RWC and elements are discussed above, any gameplay resource can be utilized to advance randomized initial condition hybrid game gameplay as appropriate to the specification of a specific application in accordance with embodiments of the invention. Various hybrid games are discussed in Patent Cooperation Treaty Application No. PCT/US11/26768, filed Mar. 1, 2011, entitled ENRICHED GAME PLAY ENVIRONMENT (SINGLE and/or MULTIPLAYER) FOR CASINO APPLICATIONS and Patent Cooperation Treaty Application No. PCT/US11/63587, filed Dec. 6, 2011, entitled ENHANCED SLOT-MACHINE FOR CASINO APPLICATIONS each disclosure of which is hereby incorporated by reference in its entirety.

In many embodiments, a randomized initial condition hybrid game utilizes a randomized initial condition module to generate initial conditions in an entertainment game. An initial condition is a configuration of the entertainment game from where entertainment game gameplay can progress, such as but not limited to wind conditions in an archery themed entertainment game or an opponent's skill level in a boxing themed entertainment game. Payout parameters can also be determined upon the generation of initial conditions. The payout parameters can be used in executing a wager to yield a randomly generated wager payout of gameplay resources in a gambling game, such as but not limited to different odds for a payout upon hitting different rings of a target in an archery themed entertainment game or where different pay tables are used for a wager based upon a player's performance in boxing with an opponent in a boxing themed entertainment game.

In several embodiments, a randomized initial condition module is constructed to communicate an initial condition random value request to a real world engine. The initial condition random value request can trigger a random number generator of a real world engine to generate at least one initial condition random value. The initial condition random value request can occur at any point during entertainment game gameplay progression, including but not limited to a point at the initiation of the entertainment game gameplay session or upon the occurrence of an event during the entertainment game gameplay session.

In numerous embodiments, a randomized initial condition module can communicate an initial condition setting to an entertainment software engine that triggers the entertainment software engine to generate an initial condition within an entertainment game gameplay session. In many embodiments, an initial condition setting is based upon at least one initial condition random value. In certain embodiments, a relationship between an initial condition random value and an initial condition setting is determined in accordance with at least one initial condition setting determination rule. The initial condition setting can be any setting that provides instruction to the entertainment software engine for generation of an initial condition, such as but not limited to an instruction on a value and direction for wind in an archery themed entertainment game or an instruction on a skill level to be ascribed to a boxing opponent in a boxing themed entertainment game.

In several embodiments, at least one payout parameter can be determined upon the generation of an initial condition in accordance with at least one payout parameter determination rule. A payout parameter is information that can be used by a wager execution rule to determine a wager payout. Examples of payout parameters that can be used to determine a wager payout can include (but is not limited to): payout tables, random values generated by a RNG of a RWE, a predetermined gambling result (generated by an RWE) that can be scaled by wagered gameplay resources to yield a wager payout or a reference GWC value that can be compared to GWC earned by a player in an entertainment game gameplay session to determine a wager payout.

In a number of embodiments, a randomized initial condition module can communicate a gambling event occurrence detected from the skillful execution of the entertainment game in accordance with at least one gambling event occurrence rule to a real world engine. In many embodiments, a gambling event occurrence can trigger a wager made using at least one payout parameter in accordance with a wager execution rule within the gambling game executed by the real world engine. The wager can be executed to produce a wager payout as a randomly generated payout of gameplay resources.

In numerous embodiments, a randomized initial condition module can be implemented locally on a randomized initial condition hybrid game within the GWE, remotely on at least one server accessible to a randomized initial condition hybrid game via a network, or as a distributed system where processes of a randomized initial condition module occur locally on a randomized initial condition hybrid game and on a remote server.

Randomized initial condition hybrid games in accordance with embodiments of the invention are discussed below.

Randomized Initial Condition Hybrid Games

In many embodiments, a randomized initial condition hybrid game integrates high-levels of entertainment content with a game of skill (entertainment game) and a gambling experience with a game of chance (gambling game). A randomized initial condition hybrid game provides for random outcomes independent of player skill while providing that the user's gaming experience (as measured by obstacles/challenges encountered, time of play and other factors) is shaped by the player's skill. The randomized initial condition hybrid game can also utilize a randomized initial condition module to generate initial conditions in an entertainment game that affects entertainment game gameplay progression. Payout parameters used in a wager within a gambling game can also be determined upon the generation of initial conditions. A randomized initial condition hybrid game in accordance with an embodiment of the invention is illustrated in FIG. 1. The randomized initial condition hybrid game 128 includes a RWE 102, GWE 112, ESE 120, gambling game user interface 122 and entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the randomized initial condition hybrid game 128 and controls and operates the gambling game. The operation of a gambling game is enabled by RWC, such as money or other real world funds. A gambling game can increase or decreases an amount of RWC based on random gambling outcomes, where the gambling proposition of a gambling game is typically regulated by gaming control bodies. In many embodiments, the RWE includes a RW operating system (OS) 104, random number generator (RNG) 106, level n real-world credit pay tables (table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (table Ln-RWC) 108 is a table that can be used in conjunction with a random number generator (RNG) 106 to dictate the real world credits (RWC) earned as a function of randomized initial condition hybrid game gameplay and is analogous to the pay tables used in a conventional slot machine. Table Ln-RWC payouts are independent of player skill. There can be one or a plurality of table Ln-RWC pay tables 108 contained in a gambling game, the selection of which can be determined by factors including (but not limited to) game progress a player has earned, and/or bonus rounds which a player can be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the table Ln-RWC real world credits pay table 108, independent of player skill. In certain embodiments, an amount of RWC can be used as criteria in order to enter higher entertainment game levels. RWC can be carried forward to higher game levels or paid out if a cash out is opted for by a player. The amount of RWC used to enter a specific level of the game level n need not be the same for each level.

In many embodiments, the GWE 112 manages the overall randomized initial condition hybrid game operation, with the RWE 102 and the ESE 120 effectively being support units to the GWE 112. In several embodiments, the GWE 112 contains mechanical, electronic and software system for an entertainment game. The GWE 112 includes an operating system (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE also contains the randomized initial condition module 119. The GWE 112 can also couple to a centralized server for exchanging various data related to the player and their activities on the game. The GWE 112 furthermore couples to the ESE 120.

In many embodiments, a level n game world credit pay table (Table Ln-GWC) 116 dictates the GWC earned as a function of player skill in the nth level of the game. The payouts governed by this table are dependent upon player skill and randomized initial condition hybrid game gameplay at large and can or cannot be coupled to a random number generator. In several embodiments, game world credits (GWC) are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the entertainment game. GWC can be carried forward from one level of sponsored gameplay to another, and ultimately paid out in various manners such as directly in cash, or indirectly such as by earning entrance into a sweepstakes drawing, or earning participation in, or victory in, a tournament with prizes. GWC can be stored on a player tracking card or in a network-based player tracking system, where the GWC is attributed to a specific player.

In certain embodiments, the operation of the GWE does not affect the RWE's gambling operation except for player choice parameters that are allowable in slot machines including but not limited to wager terms such as but not limited to a wager amount, how fast the player wants to play (by pressing a button or pulling the handle of a slot machine) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of a randomized initial condition hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters to the ESE 120 to affect its play, such as (but not limited to) initial condition random values, what level of character to be using, changing the difficulty level of the game, changing the type of gun or car in use, and/or requesting potions to become available or to be found by the character. These game control parameters can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the entertainment game. The GWE's job in this architecture, being interfaced thusly to the ESE 120, is to allow the transparent coupling of an entertainment game to a fair and transparent random chance gambling game, providing a seamless perspective to the player that they are playing a typical popular entertainment game (which is skill based). In certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall hybrid game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include but is not limited to gameplay with a more powerful character, a more powerful gun, or a better car. These choices can increase or decrease the amount wagered per individual gambling game, in the same manner that a standard slot machine player can decide to wager more or less credits for each pull of the handle. In several embodiments, the RWE 102 can communicate a number of factors back and forth to the GWE 112, via an interface, such that an increase/decrease in a wagered amount can be related to the player's decision making as to their player profile in the entertainment game (such as but not limited to the power of the character, gun selection or car choice). In this manner, a player can be in control of a per game wager amount, with the choice mapping to a parameter or component that is applicable to the entertainment game experience. In a particular embodiment, the RWE 102 operation can be a game of chance as a gambling game running every 10 seconds where the amount wagered is communicated from the GWE 112 as a function of choices the player makes in the player's player profile in the entertainment game.

In many embodiments, a randomized initial condition hybrid game integrates a video game style gambling machine, where the gambling game (including an RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate gamers can be established with the entertainment game. In several embodiments, the randomized initial condition hybrid game can leverage popular titles with gamers and provides a sea change environment for casinos to attract players with games that are more akin to the type of entertainment that a younger generation desires. In various embodiments, players can use their skill towards building and banking GWC that in turn can be used to win tournaments and various prizes as a function of their gamer prowess. Numerous embodiments minimize the underlying changes applied to the aforementioned entertainment software for the hybrid game to operate within an entertainment game construct. Therefore, a plethora of complex game titles and environments can be rapidly and inexpensively to deployed in a gambling environment.

In certain embodiments, randomized initial condition hybrid games also allow players to gain entry into subsequent competitions through the accumulation of game world credits (GWC) as a function of the user's demonstrated skill at the game. These competitions can pit individual players or groups of players against one another and/or against the operator of a gambling game (such as but not limited to a casino) to win prizes based upon a combination of chance and skill. These competitions can be either asynchronous events, whereby players participate at a time and/or place of their choosing, or they can be synchronized events, whereby players participate at a specific time and/or venue.

In many embodiments, one or more players can be engaged in playing a skill based entertainment game executed by the ESE. A randomized initial condition hybrid game can include an entertainment game that includes head to head play between a single player and the computer, between two or more players against one another, or multiple players playing against the computer and/or each other, as well as a process by which player can bet on the outcome of an entertainment game. The entertainment game can also be a game where the player is not playing against the computer or any other player, such as in games where the player is effectively playing against himself or herself (such as but not limited to Solitaire and Babette).

Figure 2:
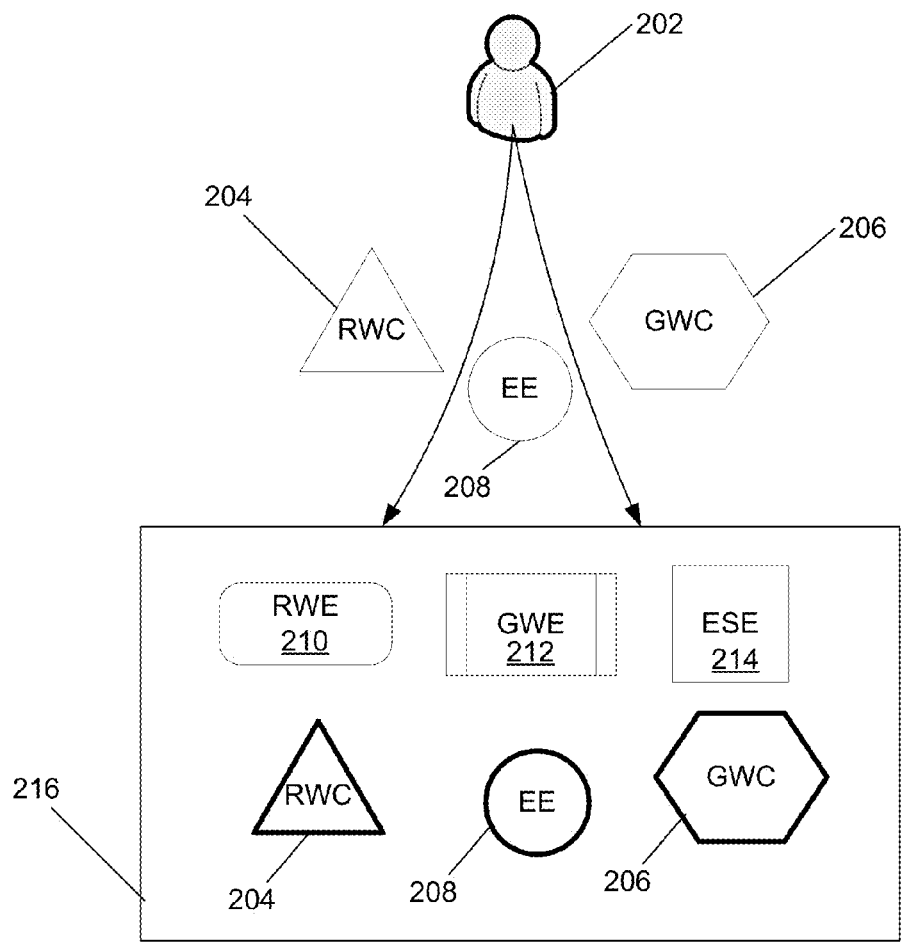
FIG. 2 is a conceptual diagram that illustrates how resources are utilized in a randomized initial condition hybrid game in accordance with an embodiment of the invention.

In several embodiments, a player can interact with a randomized initial condition hybrid game by using RWC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RWC and elements, such as but not limited to EE, are utilized in a randomized initial condition hybrid game in accordance with an embodiment of the invention is illustrated in FIG. 2. The conceptual diagram illustrates that RWC 204, EE 208 and GWC 206 can be utilized by a player 202 in interactions with the RWE 210, GWE 212 and ESE 214 of a randomized initial condition hybrid game 216. The contribution of elements, such as EE 208, can be linked to a player's access to credits, such as RWC 204 or GWC 206. Electronic receipt of these credits can come via a smart card, voucher or other portable media, or as received over a network from a server. In certain implementations, these credits can be drawn on demand from a player profile located in a database locally on a randomized initial condition hybrid game or in a remote server.

Figure 3:
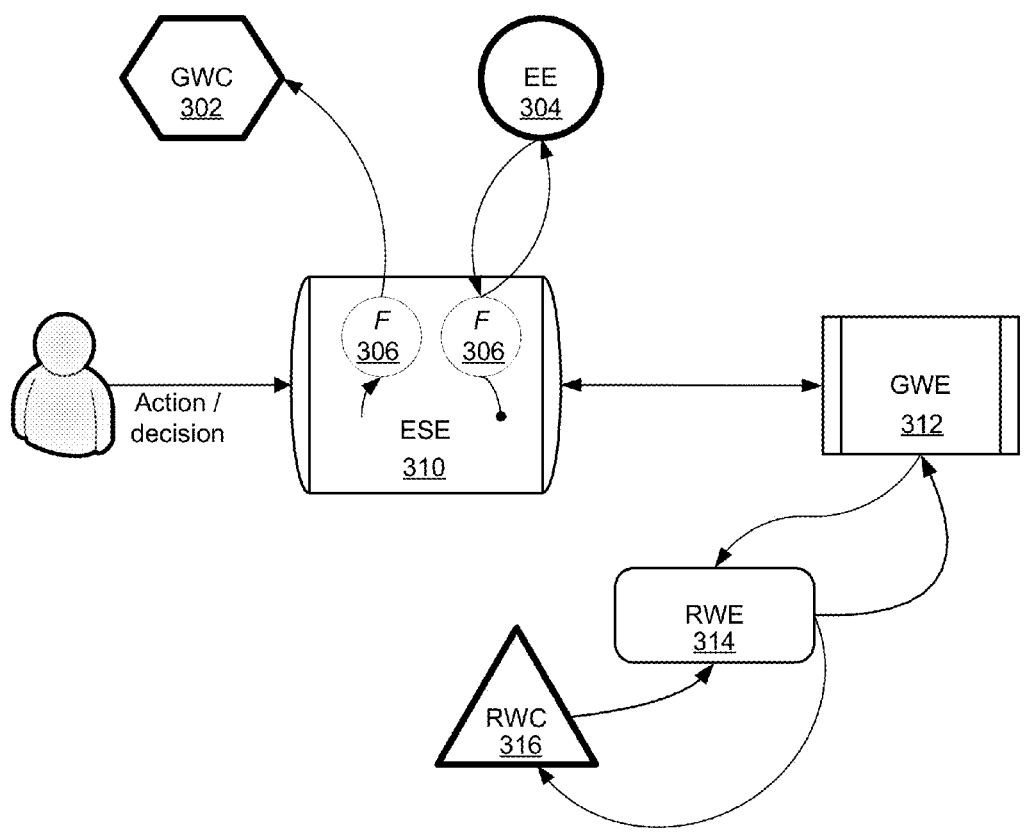
FIG. 3 is a conceptual diagram that illustrates interplay between resources and components of a randomized initial condition hybrid game in accordance with an embodiment of the invention.

A conceptual diagram that illustrates interplay between elements and components of a randomized initial condition hybrid game in accordance with an embodiment of the invention is illustrated in FIG. 3. Similar to FIG. 2, a player's actions and/or decisions can affect functions 306 that consume and/or accumulate GWC 302 and/or EE 304 in an entertainment game executed by an ESE 310. A GWE 312 can monitor the activities taking place within an entertainment game executed by an ESE 310 for gameplay gambling event occurrences. The GWE 312 can also communicate the gameplay gambling event occurrences to an RWE 314 that triggers a wager of RWC 316 in a gambling game executed by the RWE 314.

Figure 4:
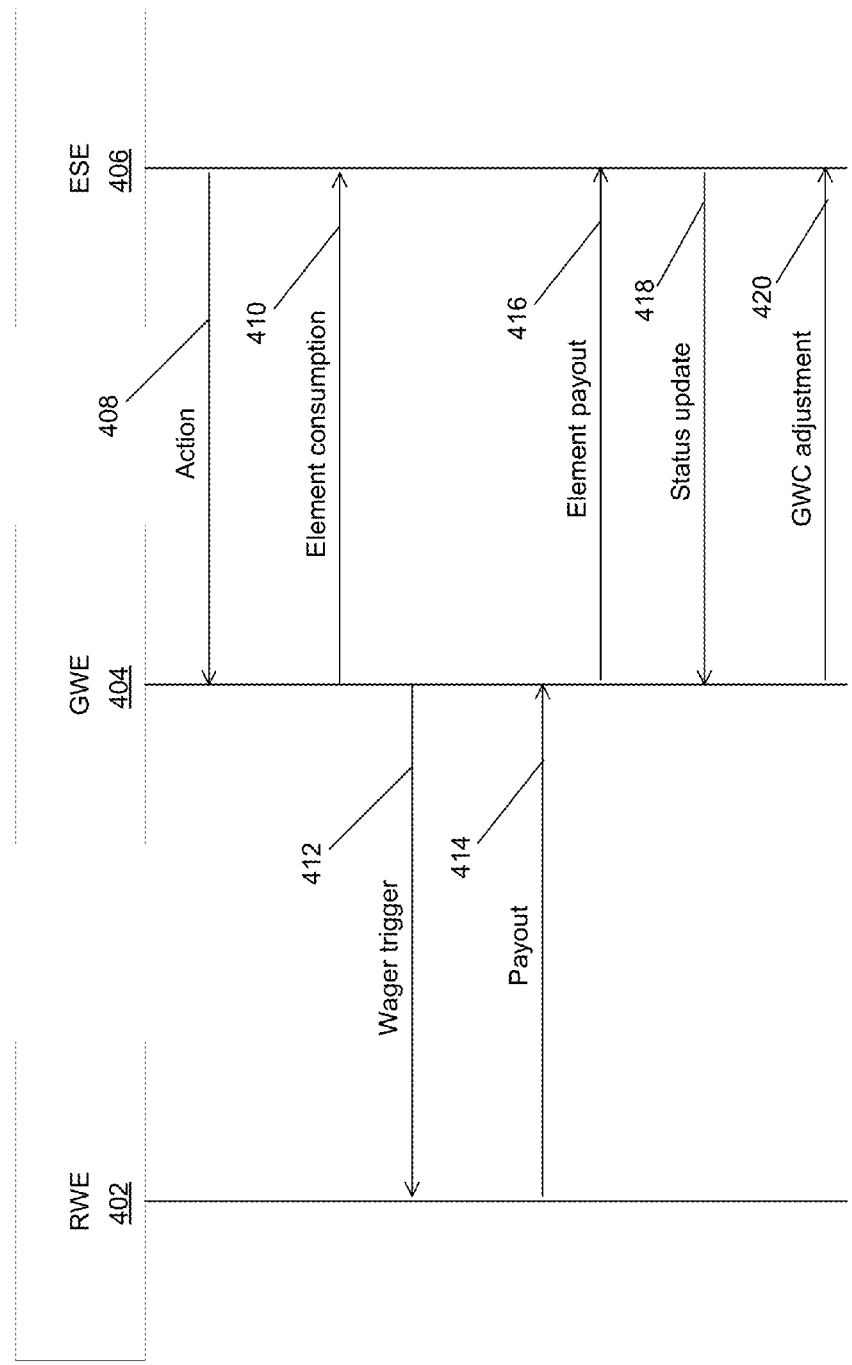
FIG. 4 is a timing diagram that illustrates a process of facilitating interactions between an entertainment game and a gambling game in accordance with embodiments of the invention.

A timing diagram that illustrates a process of facilitating interactions between an entertainment game and a gambling game in accordance with embodiments of the invention is illustrated in FIG. 4. The process includes a player performing a player action using a user interface. An ESE 406 can signal (408) a GWE 404 of the player action. The GWE 404 can signal (410) the ESE 406 as to the amount of EE that will be consumed by the player action in return. The signal can configure a function that controls EE consumption, decay or addition for the ESE. The ESE 406 can, based upon the function, consume an amount of EE designated by the GWE 404 to couple to the activity. Upon detection that the player action is a gameplay gambling event, the GWE 404 can signal an RWE 402 as to the wager terms associated with the gameplay gambling event in a triggered (412) wager. The RWE 402 can consume RWC in executing the wager. The RWE 402 can return RWC as a payout from the wager. The RWE 402 can inform (414) the GWE 404 as to the payout from the wager. The GWE 404 can signal (416) the ESE 406 to ascribe a payout of EE based upon the wager. The ESE 406 can reconcile and combine the payout of EE with the EE already ascribed to the player in the entertainment game. The ESE 406 can signal (408) the GWE 404 as to its updated status based upon reconciling the payout of EE, and the GWE 404 can signal the ESE 406 of a payout of GWC in response (420) to the status update.

In certain embodiments, the sequence of events in the timing diagram of FIG. 4 can be reflected in a first person shooter themed entertainment game. For example, a player can select a machine gun to use in an entertainment game and fire a burst at an opponent. The ESE can signal (408) the GWE of the player action, such as but not limited to signaling the GWE as to the player's choice of weapon, that a burst of fire was fired, and the outcome of whether the player hit the opponent with the burst of fire. The GWE can process the information concerning the machine gun burst, and signal (410) the ESE to consume 3 bullets (EE) with each pull of the trigger. The entertainment game then will consume 3 bullets (EE) based upon the trigger being pulled. The GWE can also signal (412) the RWE that 3 credits of RWC are to be wagered to match the 3 bullets (EE) consumed, on a particular pay table (Table Ln-RC) as a function how much damage the player inflicted on his/her opponent. The RWE can consume the 3 credits for the wager and execute the specified wager. In executing the wager, the RWE can determine that the player hits a jackpot of 6 credits, and return the 6 credits of RWC to the credit meter. The RWE can also inform (414) the GWE that 3 credits of RWC net were won as a payout from the wager. The GWE can signal (416) the ESE to add 3 bullets (EE) to the player's ammunition clip based upon the gambling game payout. The ESE can then add 3 bullets (EE) to the player's ammunition clip in the entertainment game. This can take place by directly adding them to the clip, or can happen in the context of the entertainment game, such as the player finding extra ammunition on the ground or in an old abandoned ammunition dump. The GWE can receive (418) an update from the ESE as to the total amount of EE associated with the player. The GWE can log the new player score (GWC) in the game (as a function of the successful hit on the opponent) based on the update, and signal (420) the ESE to add 2 extra points of GWC to the player's score.

In many embodiments, if an entertainment game employs an American football themed entertainment game, a player can bet on whether or not the player will beat another player. These bets can be made, for example, on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can bet against one another, or engage the computer in a head to head competition in the context of their skill level in the entertainment game in question. As such, players can have a handicap associated with their player profile that describes their skill (which can be their professed skill in certain embodiments), and which is used by a GWE (such as a local GWE or a GWE that receives services from remote servers) to offer appropriate bets around the final and/or intermediate outcomes of the entertainment game, and/or to condition sponsored gameplay as a function of player skill, and/or to select players across one or more randomized initial condition hybrid games to participate in head to head games and/or tournaments.

Many embodiments enable the maximization of the number of players able to compete competitively by enabling handicapping of players by utilizing a skill normalization module that handicaps players to even the skill level of players competing against each other. Handicapping enables players of varying performance potential to compete competitively regardless of absolute skill level, such as but not limited to where a player whose skill level identifies the player as a beginner can compete in head to head or tournament play against a highly skilled player with meaningful results.

In several embodiments, wagers can be made among numerous randomized initial condition hybrid games with a global betting manager (GBM). The GBM is a system that coordinates wagers that are made across multiple randomized initial condition hybrid games by multiple players. In some implementations it can also support wagers by third parties relative to the in game performance of other players. The GBM can stand alone, or is capable of being embedded in one of a number of systems, including a GWE, ESE or any remote server capable of providing services to a randomized initial condition hybrid game, or can operate independently on one or a number of servers on-site at a casino, as part of a larger network and/or the Internet or cloud in general.

Although various components of randomized initial condition hybrid games are discussed above, randomized initial condition hybrid games can be configured with any component as appropriate to the specification of a specific application in accordance with embodiments of the invention. In certain embodiments, components of a randomized initial condition hybrid game, such as a GWE, RWE, ESE can be configured in different ways for a specific randomized initial condition hybrid game gameplay application. Network connected randomized initial condition hybrid games are discussed below.

Network Connected Randomized Initial Condition Hybrid Games

Randomized initial condition hybrid games in accordance with many embodiments of the invention can operate locally while being network connected to draw services from remote locations or to communicate with other randomized initial condition hybrid games. In many embodiments, operations associated with a randomized initial condition hybrid game utilizing a randomized initial condition module can be performed across multiple devices. These multiple devices can be implemented using a single server or a plurality of servers such that a randomized initial condition hybrid game is executed as a system in a virtualized space, such as (but not limited to) where the RWE and GWE are large scale centralized servers in the cloud coupled to a plurality of widely distributed ESE controllers or clients via the Internet.

In many embodiments, an RWE server can perform certain functionalities of a RWE of a randomized initial condition hybrid game. In certain embodiments, a RWE server includes a centralized odds engine which can generate random outcomes (such as but not limited to win/loss outcomes) for a gambling game. The RWE server can perform a number of simultaneous or pseudo-simultaneous runs in order to generate random outcomes for a variety of odds percentages that one or more networked randomized initial condition hybrid games can use. In certain embodiments, an RWE of a randomized initial condition hybrid game can send information to a RWE server including (but not limited to) table Ln-RWC tables, maximum speed of play for a gambling game, gambling game monetary denominations or any promotional RWC provided by the operator of the randomized initial condition hybrid game. In particular embodiments, a RWE server can send information to a RWE of a randomized initial condition hybrid game including (but not limited to) RWC used in the gambling game, player profile information or play activity and a profile associated with a player.

In several embodiments, a GWE server can perform the functionality of the GWE across various randomized initial condition hybrid games. These functionalities can include (but are not limited to) providing a method for monitoring high scores on select groups of games, coordinating interactions between gameplay layers, linking groups of games in order to join them in head to head tournaments, and acting as a tournament manager.

In a variety of embodiments, management of player profile information can be performed by a patron management server separate from a GWE server. A patron management server can manage information related to a player profile, including (but not limited to) data concerning controlled entities (such as characters used by a player in entertainment game gameplay), game scores, elements, RWC and GWC associated with particular players and managing tournament reservations. Although a patron management server is discussed separate from a GWE server, in certain embodiments a GWE server also performs the functions of a patron management server. In certain embodiments, a GWE of a randomized initial condition hybrid game can send information to a patron management server including (but not limited to) GWC and RWC used in a game, player profile information, play activity and profile information for players and synchronization information between a gambling game and an entertainment game or other aspects of a randomized initial condition hybrid game. In particular embodiments, a patron management server can send information to a GWE of a randomized initial condition hybrid game including (but not limited to) entertainment game title and type, tournament information, table Ln-GWC tables, special offers, character or profile setup and synchronization information between a gambling game and an entertainment game or other aspects of a randomized initial condition hybrid game.

In numerous embodiments, an ESE server provides a host for managing head to head play, operating on the network of ESEs which are connected to the ESE server by providing an environment where players can compete directly with one another and interact with other players. Although an ESE server is discussed separate from a GWE server, in certain embodiments the functionalities of an ESE server and GWE server can be combined in a single server.

In several embodiments, a randomized initial condition hybrid game server can be connected with a randomized initial condition hybrid game and can implement a randomized initial condition module to coordinate the activities of a randomized initial condition hybrid game. A randomized initial condition module can execute as part of a randomized initial condition hybrid game server and be used by a randomized initial condition hybrid game to generate initial conditions in an entertainment game that affects entertainment game gameplay progression. Payout parameters used in a wager within a gambling game can also be determined upon the generation of initial conditions.

Servers connected via a network to implement randomized initial condition hybrid games in accordance with many embodiments of the invention can communicate with each other to provide services utilized by a randomized initial condition hybrid game. In several embodiments a RWE server can communicate with a GWE server. A RWE server can communicate with a GWE server to communicate any type of information as appropriate for a specific application, including (but not limited to): information used to configure the various simultaneous or pseudo simultaneous odds engines executing in parallel within the RWE to accomplish randomized initial condition hybrid game system functionalities, information used to determine metrics of RWE performance such as random executions run and outcomes for tracking system performance, information used to perform audits, provide operator reports, and information used to request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server during a randomized initial condition hybrid game tournament. Typically a GWE (such as a GWE that runs within a randomized initial condition hybrid game or on a GWE server) is not aware of the relationship of itself to the rest of a tournament since in a typical configuration the actual tournament play is managed by the ESE server. Therefore, management of a randomized initial condition hybrid game tournament can include (but is not limited to) tasks such as: conducting tournaments according to system programming that can be coordinated by an operator of the randomized initial condition hybrid game; allowing entry of a particular player into a tournament; communicating the number of players in a tournament and the status of the tournament (such as but not limited to the amount of surviving players, their status within the game, time remaining on the tournament); communicating the performance of its players within the tournament; communicating the scores of the various members in the tournament; and providing a synchronizing link to connect the GWEs in a tournament with their respective ESEs.

In several embodiments a GWE server can communicate with a patron management server. A GWE server can communicate with a patron management server to communicate any type of information as appropriate for a specific application, including (but not limited to) information for configuring tournaments according to system programming conducted by an operator of a randomized initial condition hybrid game, information for exchange of data used to link a player's player profile to their ability to participate in various forms of randomized initial condition hybrid game gameplay (such as but not limited to the difficulty of play set by the GWE server or the GWE), information for determining a player's ability to participate in a tournament as a function of a player's characteristics (such as but not limited to a player's gaming prowess or other metrics used for tournament screening), information for configuring GWE and ESE performance to suit preferences of a player on a particular randomized initial condition hybrid game, information for determining a player's play and gambling performance for the purposes of marketing intelligence, and information for logging secondary drawing awards, tournament prizes, RWC and GWC into the player profile.

In many embodiments, the actual location of where various algorithms and functions are executed can be located either in the game contained devices (RWE, GWE, ESE), on the servers (RWE server, GWE server, or ESE server), or a combination of both game contained devices and servers. In particular embodiments, certain functions of a RWE server, GWE server, patron management server or ESE server can operate on the local RWE, GWE or ESE contained with a randomized initial condition hybrid game locally. In certain embodiments, a server can be part of a server system including a plurality of servers, where software can be run on one or more physical devices. Similarly, in particular embodiments, multiple servers can be combined on a single physical device.

Figure 5:
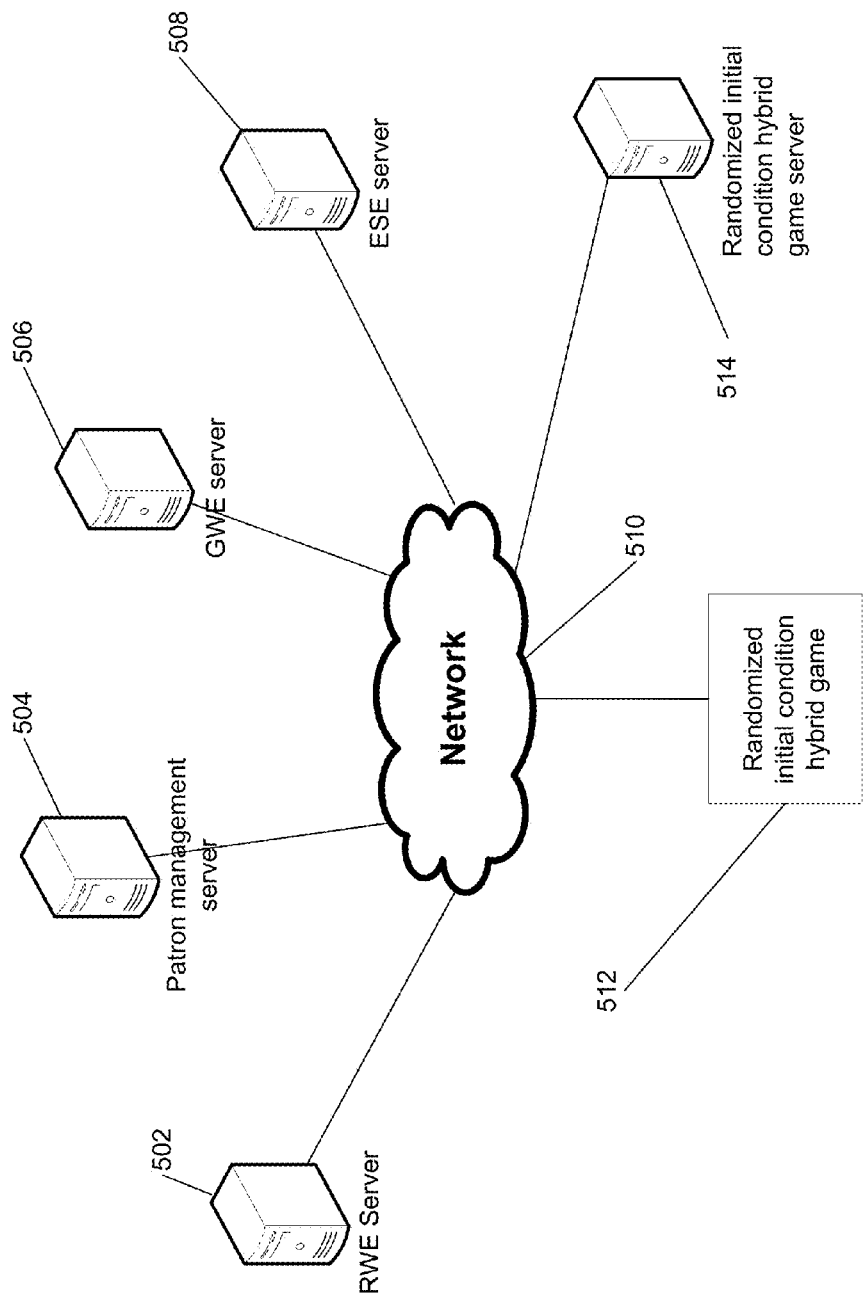
FIG. 5 is a system diagram that illustrates a network distributed randomized initial condition hybrid game in accordance with an embodiment of the invention.

Randomized initial condition hybrid games in accordance with many embodiments of the invention can be networked with remote servers in various configurations. A networked randomized initial condition hybrid game in accordance with an embodiment of the invention is illustrated in FIG. 5. The networked randomized initial condition hybrid game 512 is connected with a RWE server 502, patron management server 504, GWE server 506, ESE server 508 and a randomized initial condition hybrid game server 514 over a network 510, such as (but not limited to) the Internet. Servers networked with a networked randomized initial condition hybrid game 512 can also communicate with each of the components of a networked randomized initial condition hybrid game and amongst the other servers in communication with the networked randomized initial condition hybrid game 512.

Figure 6:
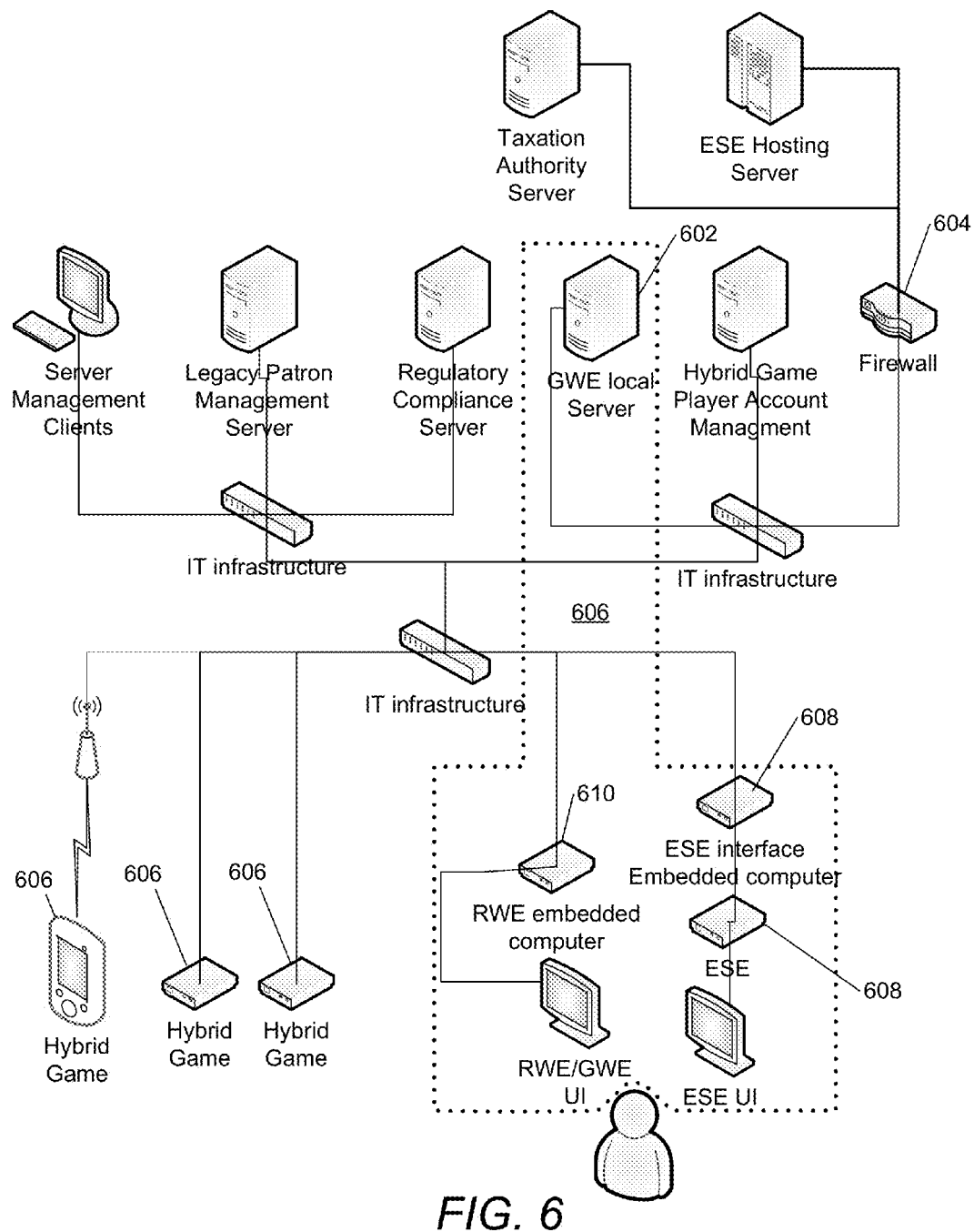
FIG. 6 is a system diagram that illustrates an implementation of a network distributed randomized initial condition hybrid game with a local device user interface in accordance with an embodiment of the invention.

A system diagram that illustrates an implementation of a network distributed randomized initial condition hybrid game with a GWE local server in accordance with an embodiment of the invention is illustrated in FIG. 6. The system includes several randomized initial condition hybrid games 606 sharing services from the same GWE local server 602 over a network. The several randomized initial condition hybrid games can be implemented on any device, including laptops, desktop computers, mobile phones, tablets over a wireless connection. A single randomized initial condition hybrid game 606 with a RWE 610, ESE 608 and GWE 602 is enclosed within a dotted line. A number of other peripheral systems, such as player management, casino management, regulatory, and hosting servers can also interface with the randomized initial condition hybrid games over a network within an operator's firewall 604. Also, other servers can reside outside the bounds of a network within an operator's firewall 604 to provide additional services for network connected randomized initial condition hybrid games.

Figure 7:
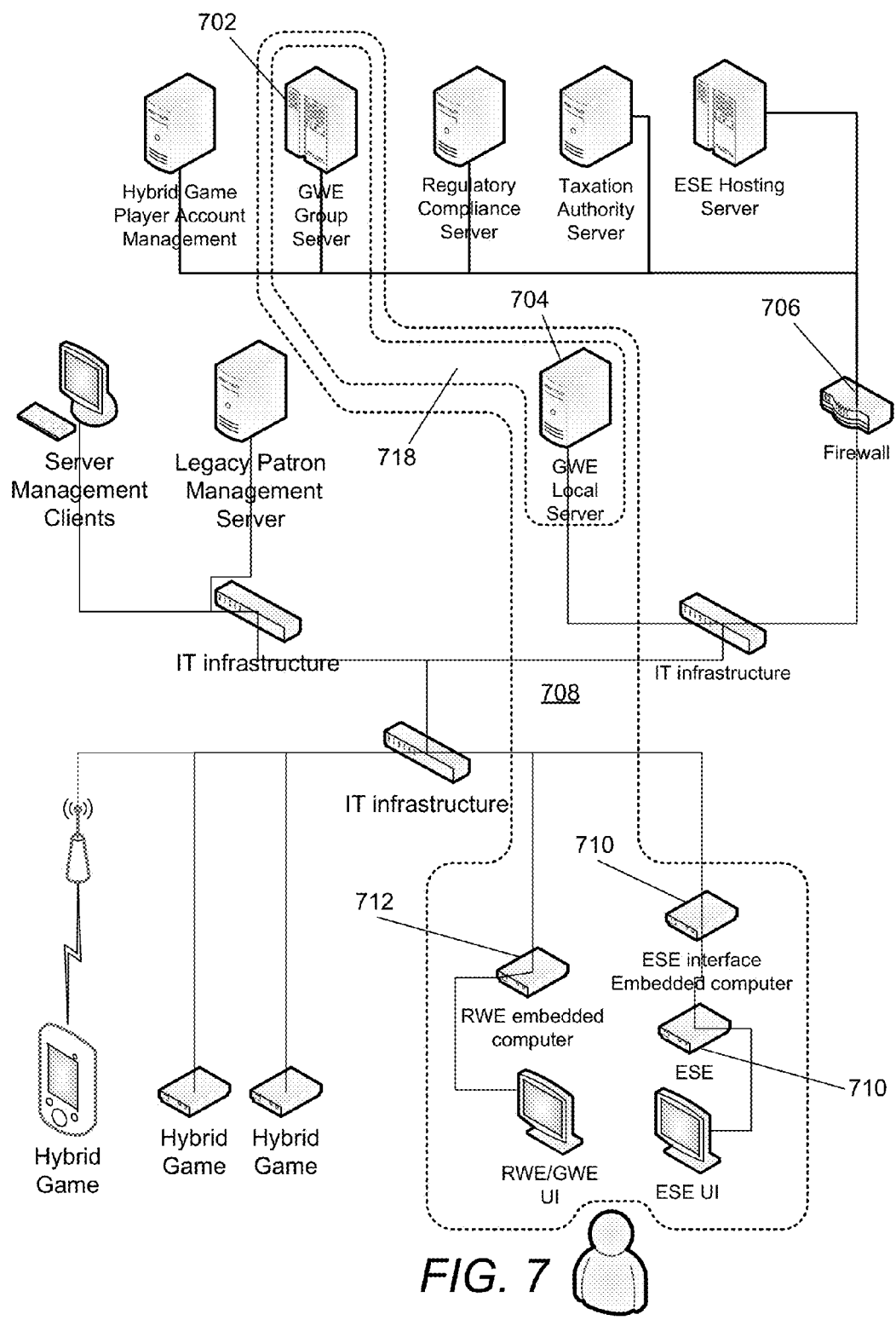
FIG. 7 is a system diagram that illustrates an implementation of a network distributed randomized initial condition hybrid game including a game world engine group server in accordance with an embodiment of the invention.

A system diagram that illustrates an implementation of a network distributed hybrid game with a GWE local server and a GWE group server in accordance with an embodiment of the invention is illustrated in FIG. 7. This system includes a randomized initial condition hybrid game with a RWE 712, ESE 710 and GWE local server 704 enclosed within a dotted line but where a single hybrid game can call upon services from servers within an operator's firewall 706 (such as but not limited to a GWE local server) as well as beyond an operator's firewall 706 (such but not limited to a GWE group server 702). The GWE group server 702 can coordinate multiple randomized initial condition hybrid games from across a network that spans beyond an operator's firewall 706. A GWE server system 718 can include multiple GWE servers, such as but not limited to a GWE local server 704 and a GWE group server 702. Multiple network connected hybrid games can be implemented using various computing devices (such as but not limited to laptops, desktop computers, mobile phones, PDAs or tablets) and be connected to various servers to call upon services that enable the execution of the hybrid game.

Figure 8:
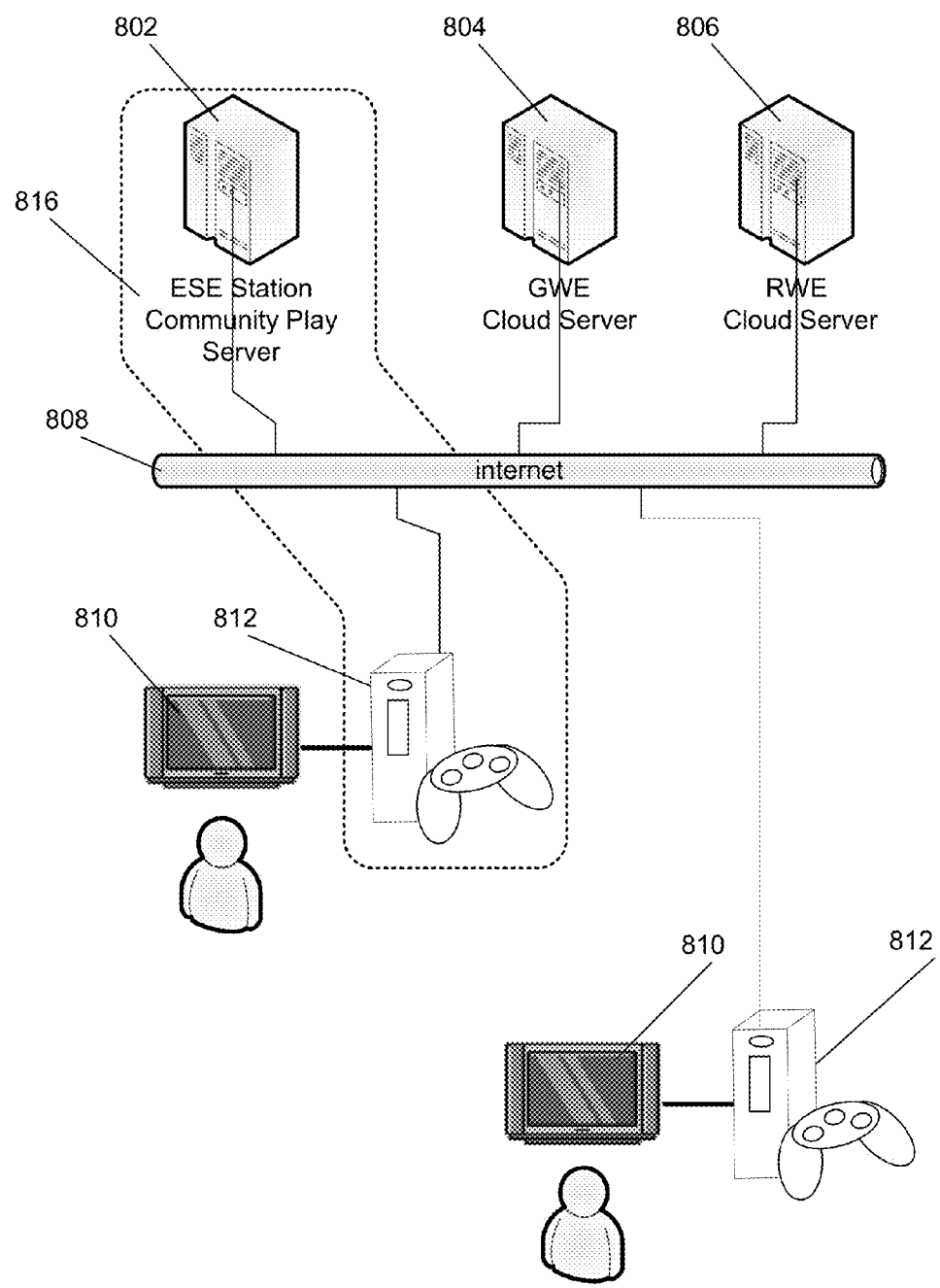
FIG. 8 is a system diagram that illustrates an implementation of an Internet distributed randomized initial condition hybrid game in accordance with an embodiment of the invention.

A system diagram that illustrates an implementation of network distributed hybrid games over the Internet in accordance with an embodiment of the invention is illustrated in FIG. 8. The system includes an ESE server 802, GWE server 804 and RWE server 806 that connects to a user interface 810 (such as but not limited to a television screen, computer terminal, tablet, touchscreen or PDA) of randomized initial condition hybrid games over the Internet 808. Each randomized initial condition hybrid game includes a local ESE 812 that also interfaces with a remote ESE server 802. Processes performed by an ESE 816 can be performed in multiple locations, such as but not limited to remotely on an ESE server 802 and locally on a local ESE 812.

Although various networked randomized initial condition hybrid games are discussed above, randomized initial condition hybrid games can be networked in any configuration as appropriate to the specification of a specific application in accordance with embodiments of the invention. In certain embodiments, components of a networked randomized initial condition hybrid game, such as a GWE, RWE, ESE or servers that perform services for a GWE, RWE or ESE, can be networked in different configurations for a specific networked randomized initial condition hybrid game gameplay application. Randomized initial condition modules are discussed below.

Randomized Initial Condition Modules

Randomized initial condition hybrid games in accordance with many embodiments of the invention can utilize randomized initial condition modules to generate initial conditions in an entertainment game that affects both entertainment game gameplay progression and payout parameters used in executing a wager within a gambling game. In various embodiments, a randomized initial condition module can be utilized by a GWE to request initial condition random values to be generated by a RNG of a RWE. The initial condition random values can be used by the randomized initial condition module to determine an initial condition setting. The initial condition setting can be used as an instruction that is sent to an ESE to implement an initial condition in the entertainment game. In several embodiments, payout parameters utilized in executing a wager can be determined upon the generation of initial conditions in accordance with a payout parameter determination rule. The payout parameters can be utilized by a RWE in executing a wager in a gambling game triggered by detection of a gambling event occurrence to yield a randomly generated payout of gameplay resources. In several embodiments, payout parameters used to determine a wager payout are independent of entertainment game gameplay progress following generation of an initial condition. In a number of embodiments, payout parameters used to determine a wager payout can be related to entertainment game gameplay progress following generation of an initial condition, such as but not limited to where the payout parameters can include a number of pay tables that can be used depending upon a player's entertainment game gameplay progress.

Figure 9:
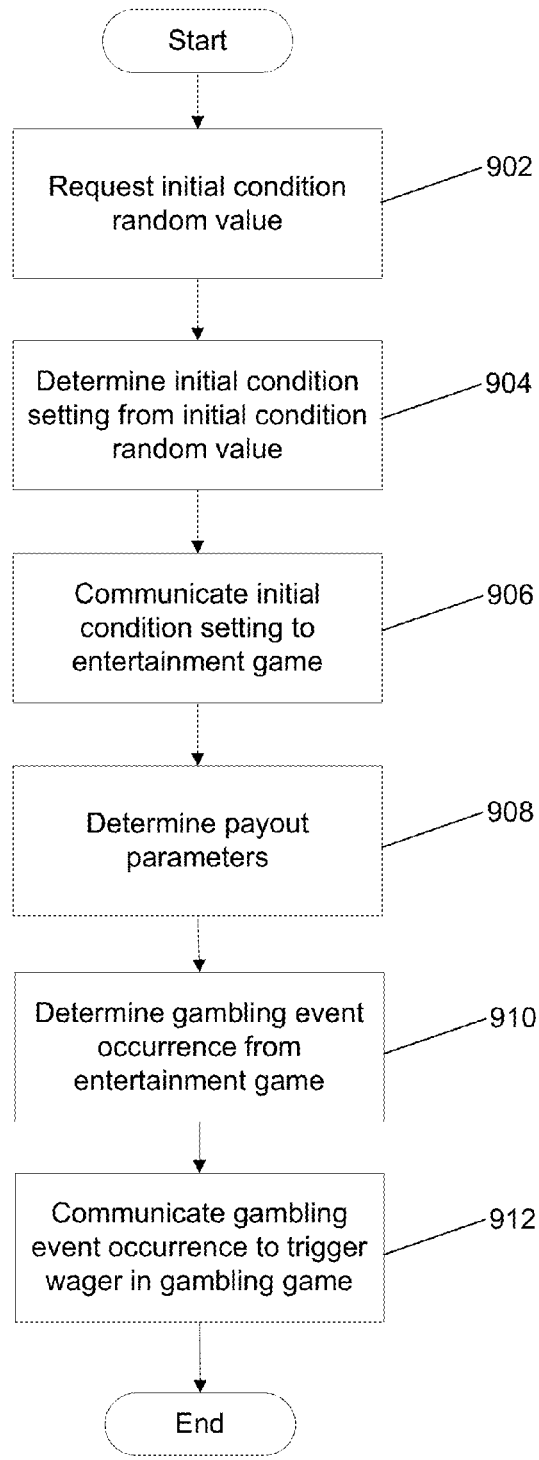
FIG. 9 illustrates a flow chart of a process for triggering a wager in a randomized initial condition hybrid game gameplay session in accordance with an embodiment of the invention.

A flow chart of a process for triggering a wager in a randomized initial condition hybrid game gameplay session in accordance with an embodiment of the invention is illustrated in FIG. 9. The process includes requesting (902) an initial condition random value using a randomized initial condition module. The initial condition random value can be utilized to determine (904) an initial condition setting. The initial condition setting can be communicated (906) to an ESE to generate an initial condition within the entertainment game. Payout parameters can be determined (908) by the randomized initial condition module upon determining the initial conditions in accordance with a payout parameter determination rule. A gambling event occurrence can also be determined (910) from information concerning the entertainment game and communicated (912) to a RWE to trigger a wager in a gambling game to yield a randomly generated payout of gameplay resources.

Figure 10:
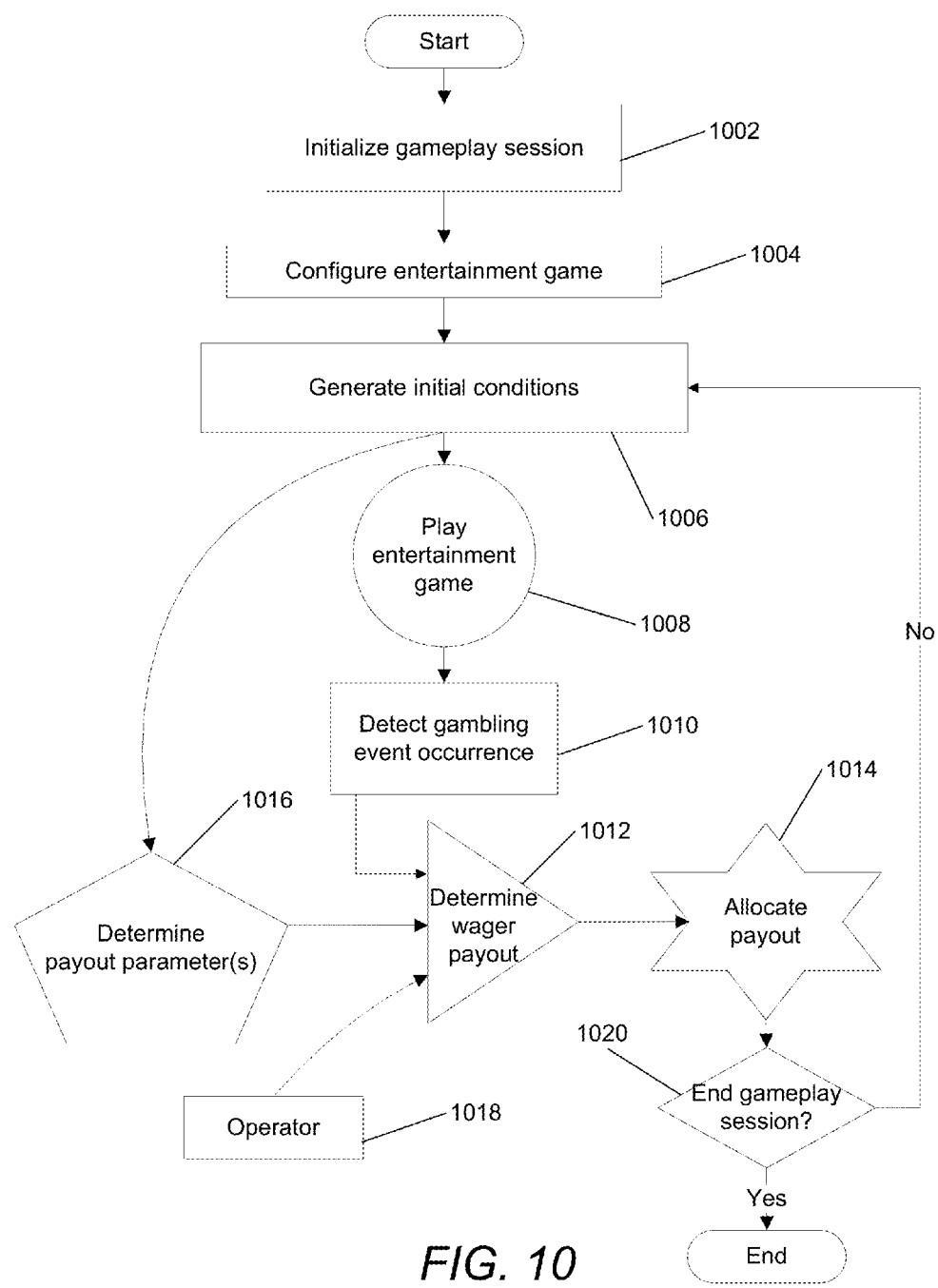
FIG. 10 illustrates a flow chart of a process of randomized initial condition hybrid game gameplay in accordance with an embodiment of the invention.

A flow chart of a process of randomized initial condition hybrid game gameplay in accordance with an embodiment of the invention is illustrated in FIG. 10. The process includes initializing (1002) a randomized initial condition hybrid game gameplay session. The randomized initial condition hybrid game gameplay session can be configured (1004) to generate (1006) an initial condition in the entertainment game. In several embodiments, a RNG of a RWE is used to generate an initial condition random value that is used to set initial conditions for the entertainment game. Payout parameters can be determined (1016) upon determining the initial conditions. A player can progress through entertainment game gameplay from the initial conditions by playing (1008) the entertainment game. A wager can be triggered upon the determination (1010) of a gambling event occurrence within the entertainment game. The wager can be executed in view of the payout parameters to determine (1012) a randomly generated payout of gameplay resources in accordance with a wager execution rule. An operator 1018 of the randomized initial condition hybrid game, such as but not limited to a casino that hosts the randomized initial condition hybrid game, can monitor and/or control the determination of the wager payout as designed by the dotted line. The payout can be allocated (1014) to a player account and a decision (1020) can be made as to whether the randomized initial condition hybrid game gameplay session has ended. If the randomized initial condition hybrid game gameplay session has not ended, then new initial conditions can be generated (1006). If the randomized initial condition hybrid game gameplay session is to end, then the process ends.

Although various randomized initial condition modules are discussed above, randomized initial condition hybrid games can utilize randomized initial condition modules in any configuration as appropriate to the specifications of a specific application in accordance with embodiments of the invention. Randomized initial condition module implementations are discussed below.

Randomized Initial Condition Module Implementations

In several embodiments, a randomized initial condition hybrid game can implement an entertainment game with a gameplay theme. Any gameplay theme can be implemented by an entertainment game of a randomized initial condition hybrid game, such as but not limited to an archery themed entertainment game or a boxing themed entertainment game. For example, in particular embodiments of an archery themed entertainment game, a player can use a fixed number of arrows to shoot at a target. Before each shot, the randomized initial condition hybrid game can generate initial conditions from which an entertainment game gameplay session can progress, such as but not limited to an amount and direction of wind that affects the path of arrows on the way to the target. Payout parameters can also be determined upon generating the initial conditions. The payout parameters can be used in determining a wager payout for shooting an arrow that strikes one of the rings on the target. The payout parameters can include different odds for a wager payout upon striking different rings of the target. In certain embodiments, payout parameters can be defined such that that rings closer to the bull's-eye of a target can be associated with better odds than rings farther away from the bull's-eye of a target. In particular embodiments, the different odds can be reflected in a predetermined gambling result that is exposed upon striking a particular ring of the target. In playing the entertainment game, a player can launch an arrow at a target. Each arrow can corresponds to an EE with a certain amount of RWC associated with it for making a wager. A gambling event occurrence can be established upon an arrow striking the target. A wager payout can be determined from a wager executed in accordance with payout parameters associated with the particular ring on the target that the arrow struck. A user interface for the entertainment game can publish information concerning change in the number of arrows (EE) available to the player as well as the amount of RWC allocated to the player as a result of the wager payout.

Figure 11:
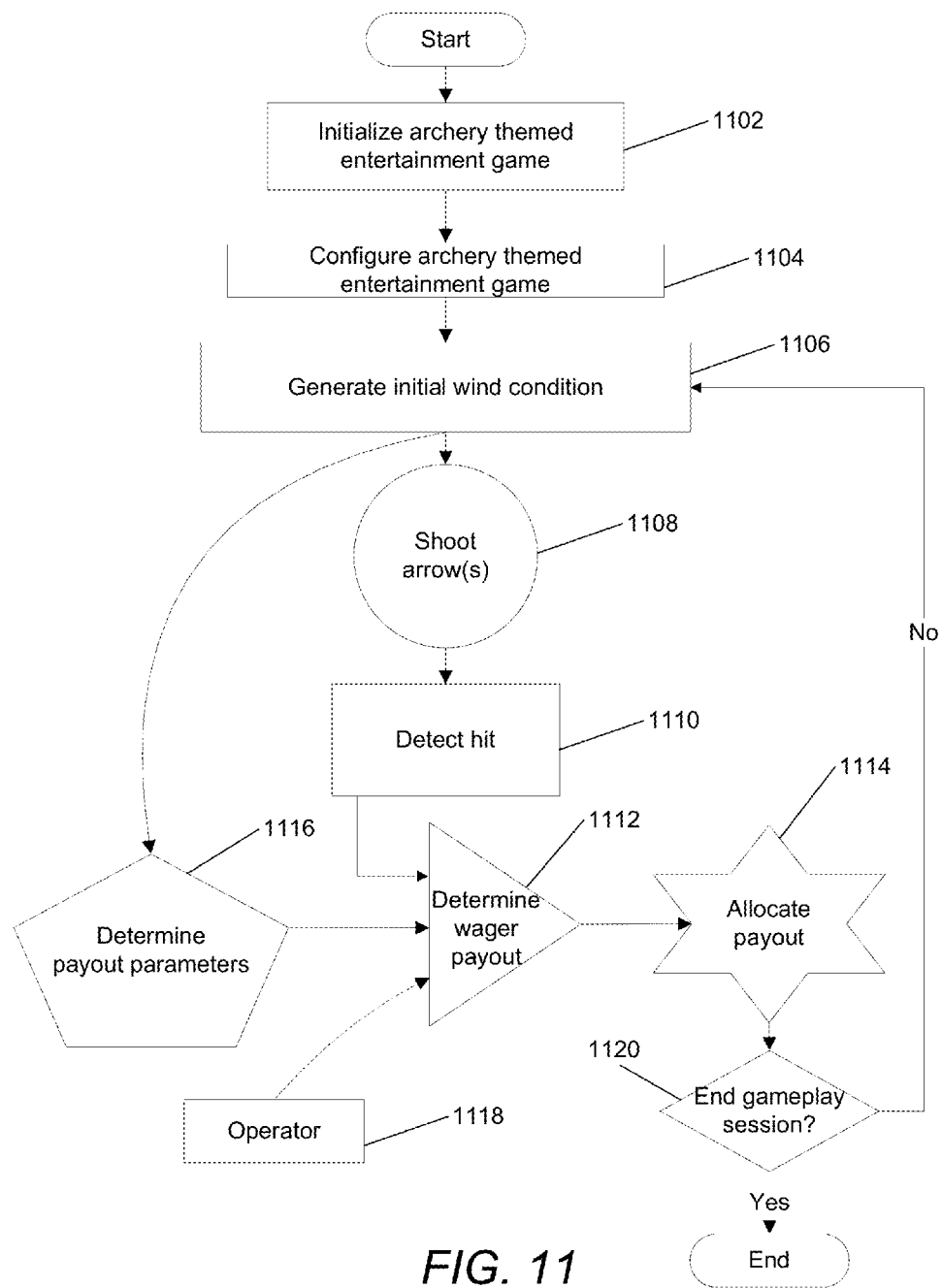
FIG. 11 illustrates a flow chart of a process of randomized initial condition hybrid game gameplay with an archery themed entertainment game in accordance with an embodiment of the invention.

A flow chart of a process of randomized initial condition hybrid game gameplay with an archery themed entertainment game in accordance with an embodiment of the invention is illustrated in FIG. 11. The process includes initializing (1102) the archery themed entertainment game. The archery themed entertainment game can be configured (1104) to generate (1106) a randomly generated initial condition for wind. Payout parameters can also be determined (1116) upon generating the initial condition for wind. The payout parameters can be used in determining different odds for a wager payout from shooting an arrow that strikes one of the rings on the target. A player can progress through the entertainment game by shooting (1108) arrows at the target. Upon hitting (1110) the target, a wager payout can be determined (1112) from a wager executed in accordance with payout parameters associated with the particular ring on the target that the arrow struck. An operator 1118, such as but not limited to a casino that hosts the randomized initial condition hybrid game, can monitor and/or control the wager payout determination. The wager payout can be allocated (1114) to a player profile. A decision (1120) can be made as to whether the entertainment game gameplay session should continue. If the entertainment game gameplay session continues, new randomly generated initial condition for wind in the entertainment game can be generated (1106). If the entertainment game gameplay session is to end, then the process ends.

In several embodiments, a boxing themed entertainment game can be implemented in a randomized initial condition hybrid game. The boxing themed entertainment game can pit a player that controls a boxer (as a CE) in a fight with an opponent boxer (as a randomly generated initial condition). The randomly generated opponent boxer can be associated with a payout parameter that is a reference GWC value. The reference GWC value can be lower for an opponent boxer at a higher skill level and higher for an opponent boxer at a lower skill level. In several embodiments, the reference GWC value can be adjusted based upon information concerning randomized initial condition hybrid game gameplay such as but not limited to gameplay resources available to a player or settings found within a player profile. In several embodiments, vitality of a player's boxer can be utilized as EE that can be consumed when a player initiates a punch or defends from a punch. The consumption of EE can cause the player to accumulate GWC and also for RWC to be allocated in a player profile for commitment in a wager of a gambling game. A particular pay table can be applied based upon comparing the reference GWC value (payout parameter) with the amount of GWC accumulated by the player in the boxing match. A pay table associated with better odds can be utilized when amount of GWC accumulated by the player is higher than the reference GWC value. A wager can be triggered upon a gambling event occurrence, such as but not limited to the conclusion of a boxing match. A wager payout can include a quantity of RWC determined by executing a wager. A wager payout can be determined from a wager executed by a RWE with a random value generated by the RNG of the RWE interpreted using the pay table and scaled by an amount of wagered RWC. Modification of the entertainment game can also be made based upon the wager payout, such as but not limited to an increase or decrease in EE.

Figure 12:
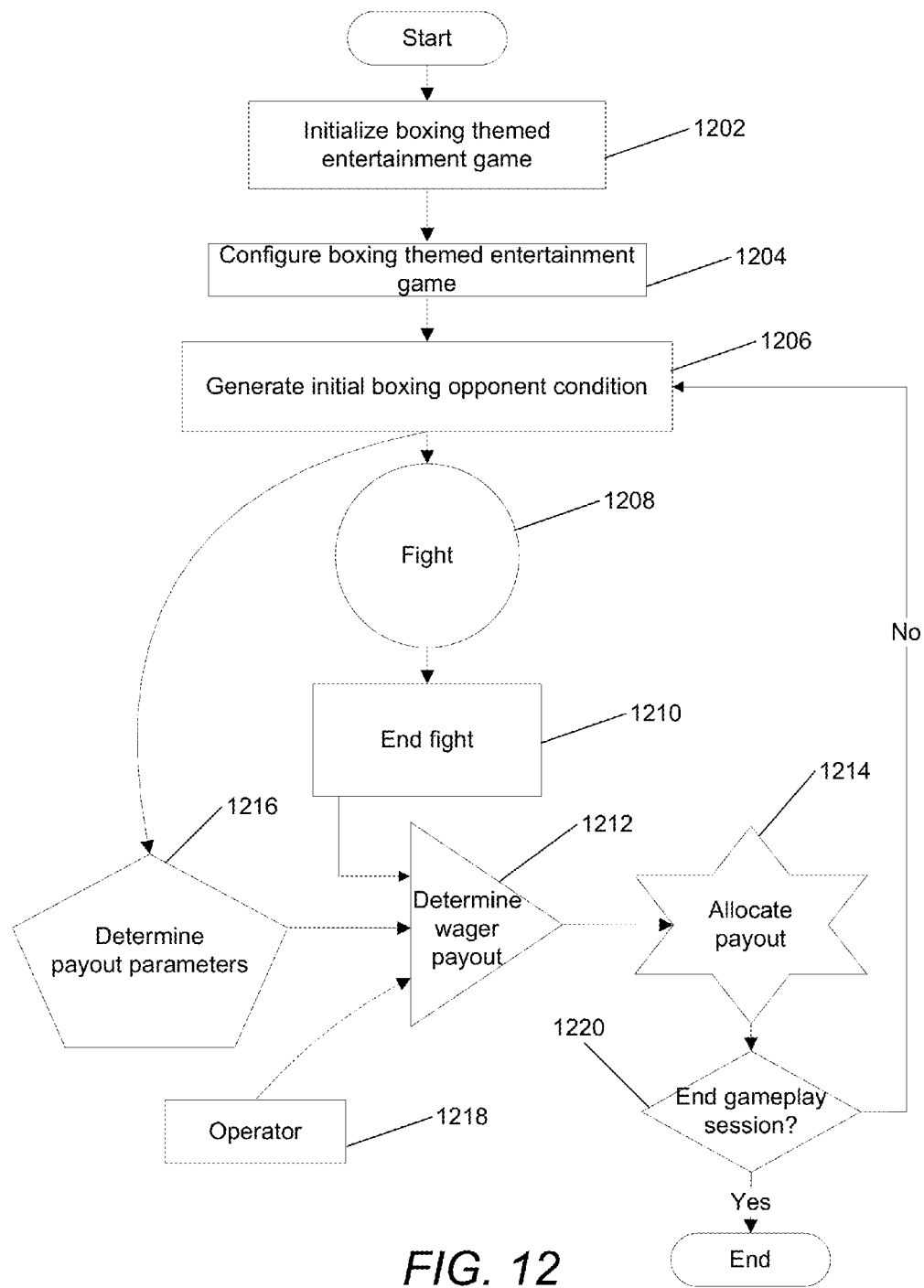
FIG. 12 illustrates a flow chart of a process of randomized initial condition hybrid game gameplay with a boxing themed entertainment game in accordance with an embodiment of the invention.

A flow chart of a process of randomized initial condition hybrid game gameplay with a boxing themed entertainment game in accordance with an embodiment of the invention is illustrated in FIG. 12. The process includes initializing (1202) the boxing themed entertainment game. The boxing themed entertainment game can be configured (1204) to generate (1206) a boxing opponent as an initial condition. Payout parameters with a reference GWC value can be determined (1216) upon generating the randomly generated boxing opponent. The payout parameters can include at least one pay table to be used in determining a wager payout based upon the difference between the reference GWC value and the amount of GWC accumulated by a player. A player can progress through the entertainment game by fighting (1208) with the randomly generated boxing opponent. Upon conclusion (1210) of a boxing match, a wager payout can be determined (1212) using an appropriate pay table as dictated by the payout parameters. An operator 1218, such as but not limited to a casino that hosts the randomized initial condition hybrid game, can monitor and/or control the wager payout determination. The wager payout can be allocated (1214) to a player profile. A decision (1220) can be made as to whether the entertainment game gameplay session should continue. If the entertainment game gameplay session continues, a new randomly generated boxing opponent as an initial condition can be generated (1206). If the entertainment game gameplay session is to end, then the process ends.

Although various constructions of randomized initial condition modules are discussed above, randomized initial condition modules can be constructed to facilitate randomized initial condition hybrid game gameplay as appropriate to the specifications of a specific application in accordance with embodiments of the invention. Processing apparatuses that can be implemented in a randomized initial condition hybrid game are discussed below.

Processing Apparatuses

Figure 13:
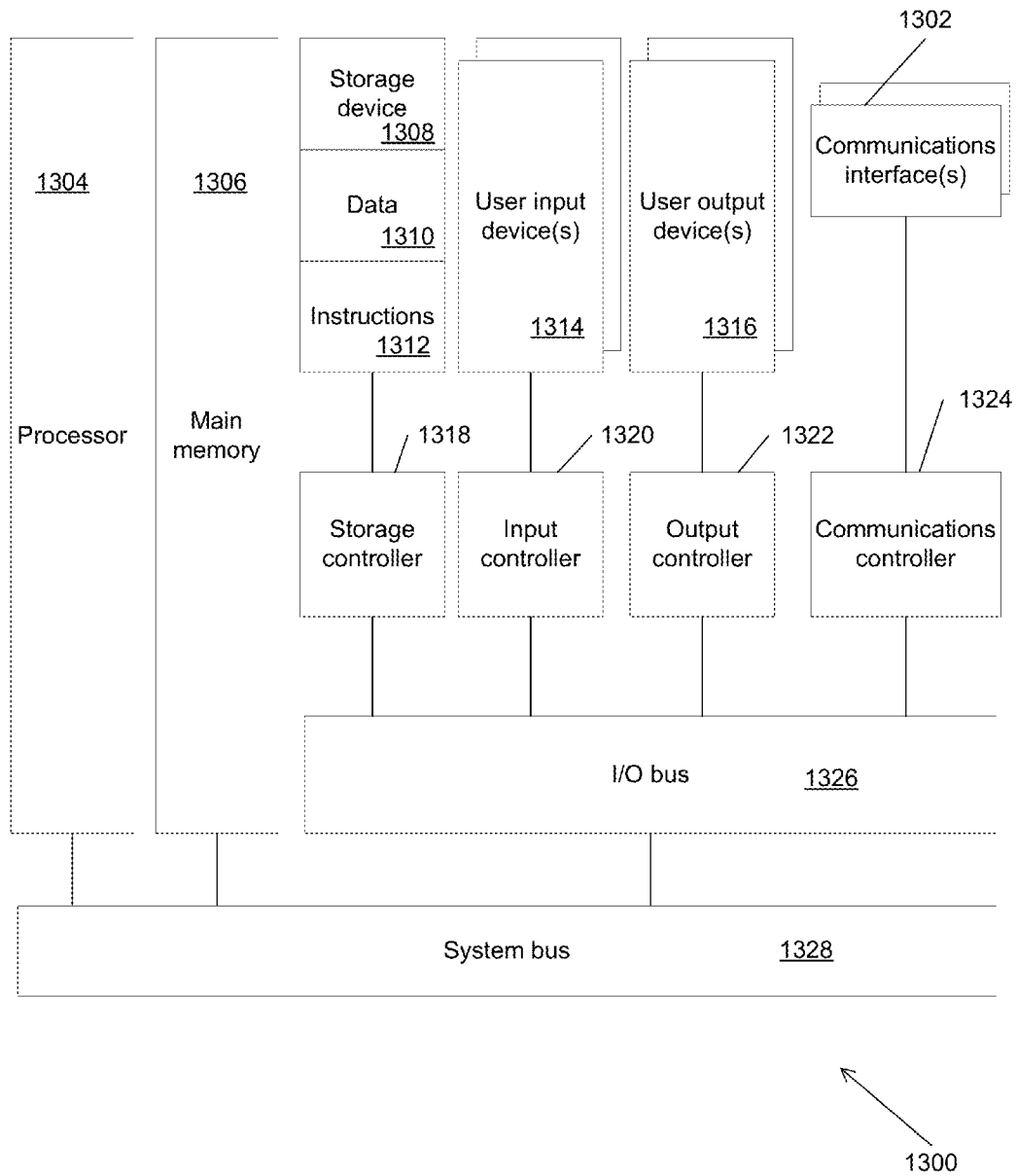
FIG. 13 illustrates a hardware architecture diagram of a processing apparatus utilized in the implementation of a randomized initial condition hybrid game in accordance with an embodiment of the invention.

Any of a variety of processing apparatuses can host various components of a randomized initial condition hybrid game in accordance with embodiments of the invention. In several embodiments, these processing apparatuses can include, but are not limited to, a gaming machine, a general purpose computer, a computing device and/or a controller. A processing apparatus that is constructed to implement a randomized initial condition hybrid game in accordance with an embodiment of the invention is illustrated in FIG. 13. In the processing apparatus 1300, a processor 1304 is coupled to a memory 1306 by a bus 1328. The processor 1304 is also coupled to non-transitory processor-readable storage media, such as a storage device 1308 that stores processor-executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including but not limited to keyboards, keypads, foot pads, touch screens, and/or trackballs, as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In various embodiments, a processor can load instructions and data from the storage device into the memory. The processor can also execute instructions that operate on the data to implement various aspects and features of the components of a randomized initial condition hybrid game. The processor can utilize various input and output devices in accordance with the instructions and the data in order to create and operate user interfaces for players or operators of a randomized initial condition hybrid game (such as but not limited to a casino that hosts the randomized initial condition hybrid game).

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or can be implemented on a single processing apparatus. In addition, while certain aspects and features of element management processes described herein have been attributed to an RWE, GWE, or ESE, these aspects and features can be implemented in a hybrid form where any of the features or aspects can be performed by any of a RWE, GWE, ESE within a randomized initial condition hybrid game without deviating from the spirit of the invention.

While the above description contains many specific embodiments of the invention, these should not be construed as limitations on the scope of the invention, but rather as an example of one embodiment thereof. It is therefore to be understood that the present invention can be practiced otherwise than specifically described, without departing from the scope and spirit of the present invention. Thus, embodiments of the present invention should be considered in all respects as illustrative and not restrictive.

What is claimed is:

1. A game system for a randomized initial condition hybrid game, comprising:
a real world engine constructed to:
generate an initial condition random value;
receive a pay table specification based on the initial condition random value;
receive a payout parameter using the initial condition random value; and
generate a gambling outcome for a wager in accordance with the specified pay table of a gambling proposition of the hybrid game;
an entertainment software engine constructed to execute an entertainment game of the hybrid game, wherein the entertainment game provides outcomes based upon a player's skillful execution of the entertainment game; and
a game world engine constructed to:
request the initial condition random value from the real world engine;
determine an initial condition setting for the entertainment game using the initial condition random value, the initial condition setting affecting a player's skillful execution of the entertainment game;

determine the specified pay table using the initial condition random value;

determine the payout parameter using the initial condition random value;

communicate the initial condition setting to the entertainment software engine that triggers the entertainment software engine to generate an initial condition within an entertainment game gameplay session that affects the player's skillful execution of the entertainment game;

detect a gambling event occurrence during the entertainment game gameplay session in which the entertainment game is being played in accordance with the initial condition;

trigger the wager of real credits in the real world engine during the entertainment game gameplay session in response to the detected gambling event occurrence, whereby the gambling outcome is generated in accordance with the payout parameter and the initial condition setting of the entertainment game; and communicate the outcome of the wager of real credits to the entertainment software engine.

2. The game system for the randomized initial condition hybrid game of claim 1, wherein the payout parameter is dependent upon entertainment game gameplay progress following the generation of the initial condition.

3. The game system for the randomized initial condition hybrid game of claim 1, wherein the payout parameter is independent of entertainment game gameplay progress following the generation of an initial condition.

4. The game system for the randomized initial condition hybrid game of claim 1, wherein the initial condition random value is generated prior to initiation of the entertainment game gameplay session.

5. The game system for the randomized initial condition hybrid game of claim 1, wherein the initial condition random value is generated during the entertainment game gameplay session.

6. The game system for the randomized initial condition hybrid game of claim 1, wherein the initial condition setting communicated to the entertainment software engine includes the initial condition random value.

7. The game system for the randomized initial condition hybrid game of claim 1, wherein gameplay resources wagered in the wager comprise gameplay resources selected from the group consisting of: real world credits, game world credits and elements, where elements are a limited resource consumed within the entertainment game to advance entertainment game gameplay.

8. The game system for the randomized initial condition hybrid game of claim 1, wherein a gambling event occurrence rule detects the gambling event occurrence as a player action that is a consumption of an element, where an element is a limited resource consumed within the entertainment game to advance entertainment game gameplay.

9. The game system for the randomized initial condition hybrid game of claim 1, wherein a gambling event occurrence rule detects the gambling event occurrence as a player action that achieves a combination of elements associated with a player profile, where elements are a limited resource consumed within the entertainment game to advance entertainment game gameplay.

10. The game system for the randomized initial condition hybrid game of claim 1, wherein the payout parameter is a predetermined gambling result generated by the real world engine prior to triggering a wager made using the payout parameter that is a predetermined gambling result, where the predetermined gambling result can be scaled by wagered gameplay resources to yield a wager payout.

* * * * *